(12) United States Patent
Minn et al.

(10) Patent No.: US 9,718,412 B2
(45) Date of Patent: Aug. 1, 2017

(54) ADJUSTABLE PORTABLE DEVICE HOLDER

(71) Applicant: Kenu, Inc., San Francisco, CA (US)

(72) Inventors: Kenneth Y. Minn, San Francisco, CA (US); David E. Yao, San Francisco, CA (US)

(73) Assignee: KENU, INC., San Francisco, CA (US)

( * ) Notice: Subject to any disclaimer, the term of this patent is extended or adjusted under 35 U.S.C. 154(b) by 0 days.

(21) Appl. No.: 14/736,090

(22) Filed: Jun. 10, 2015

(65) Prior Publication Data

US 2015/0274088 A1 Oct. 1, 2015

Related U.S. Application Data

(63) Continuation of application No. 13/897,062, filed on May 17, 2013, now Pat. No. 9,080,714, which is a
(Continued)

(51) Int. Cl.
*B60R 11/00* (2006.01)
*B60R 11/02* (2006.01)
(Continued)

(52) U.S. Cl.
CPC .......... *B60R 11/02* (2013.01); *B60R 11/0241* (2013.01); *F16B 2/065* (2013.01); *F16M 11/041* (2013.01); *F16M 11/105* (2013.01); *F16M 13/00* (2013.01); *F16M 13/022* (2013.01); *B60R 11/0258* (2013.01); *B60R 2011/0008* (2013.01);
(Continued)

(58) Field of Classification Search
CPC ............... B60R 7/06; B60R 2011/0005; B60R 2011/0008; B60R 11/0241; B60R 11/0258; B60R 2011/0294; B60R 2011/0059; B60R 2011/0071; B60R 2011/0085; B60R 11/02; Y10S 224/929
USPC ............... 224/483, 556, 275, 929, 544, 276; D12/415, 419–420
See application file for complete search history.

(56) References Cited

U.S. PATENT DOCUMENTS 2,580,625 A * 1/1952 Waltz ..................... A01K 97/10
                                                              211/120
4,523,870 A    6/1985 Spector
(Continued)

FOREIGN PATENT DOCUMENTS

CN    202907016 U    4/2013
DE    202004007340 U1    7/2004
(Continued)

OTHER PUBLICATIONS

International Search Report and Written Opinion mailed Oct. 10, 2014, in PCT patent application No. PCT/US2014/038253.*
(Continued)

*Primary Examiner* — Scott McNurlen
(74) *Attorney, Agent, or Firm* — Vierra Magen Marcus LLP (57) ABSTRACT

Adjustable portable device holder systems and methods are herein disclosed. According to one embodiment, an adjustable portable device holder includes an adjustable clamping element and a rotatable mounting element attached to the adjustable clamping element for removably securing a portable device to the adjustable portable device holder.

19 Claims, 5 Drawing Sheets

Related U.S. Application Data continuation-in-part of application No. 29/437,793, filed on Nov. 20, 2012, now Pat. No. Des. 690,707.

(51) Int. Cl.
| | |
|---|---|
| F16M 13/02 | (2006.01) |
| F16M 11/04 | (2006.01) |
| F16M 11/10 | (2006.01) |
| F16M 13/00 | (2006.01) |
| F16B 2/06 | (2006.01) |

(52) U.S. Cl.
CPC .............. B60R 2011/0059 (2013.01); B60R 2011/0071 (2013.01); B60R 2011/0085 (2013.01); B60R 2011/0294 (2013.01); Y10S 224/929 (2013.01); Y10T 29/49826 (2015.01); Y10T 29/49963 (2015.01)

(56) References Cited

U.S. PATENT DOCUMENTS

| | | | |
|---|---|---|---|
| 4,797,916 A * | 1/1989 | Kojima | F16M 11/10 248/183.2 |
| 4,840,773 A | 6/1989 | Wade | |
| 5,109,411 A | 4/1992 | O'Connell | |
| 5,305,381 A | 4/1994 | Wang et al. | |
| 5,338,252 A | 8/1994 | Bowler et al. | |
| 5,820,792 A | 10/1998 | Lin | |
| 5,979,724 A | 11/1999 | Loewenthal et al. | |
| 6,103,201 A * | 8/2000 | Green | A61L 9/122 239/289 |
| 6,123,935 A | 9/2000 | Wefler et al. | |
| 6,254,065 B1 | 7/2001 | Ehrensperger et al. | |
| 6,264,887 B1 | 7/2001 | Farmer | |
| 6,366,672 B1 | 4/2002 | Tsay | |
| 6,441,872 B1 * | 8/2002 | Ho | B60R 11/0235 224/483 |
| 6,514,467 B1 | 2/2003 | Bulsink et al. | |
| D482,039 S | 11/2003 | Chen et al. | |
| D485,340 S * | 1/2004 | Wu | D23/366 |
| 6,988,907 B2 | 1/2006 | Chang | |
| 7,061,386 B2 | 6/2006 | Seresini | |
| 7,080,812 B2 | 7/2006 | Wadsworth et al. | |
| 7,140,553 B2 | 11/2006 | Zobele | |
| D538,912 S | 3/2007 | Kaplan | |
| D538,913 S * | 3/2007 | Kaplan | D23/366 |
| 7,272,984 B2 * | 9/2007 | Fan | B60R 11/02 248/231.61 |
| 7,284,737 B2 | 10/2007 | Kane | |
| 7,389,943 B2 | 6/2008 | Jaworski | |
| D589,962 S | 4/2009 | Maruyama et al. | |
| 7,621,511 B2 | 11/2009 | Hayes-Pankhurst et al. | |
| D611,478 S | 3/2010 | Richardson et al. | |
| 7,780,094 B2 | 8/2010 | Caserta et al. | |
| 7,854,393 B2 | 12/2010 | DiBello et al. | |
| D630,222 S | 1/2011 | Lin | |
| D645,033 S | 9/2011 | Quong et al. | |
| D656,931 S | 4/2012 | Wikel | |
| D656,940 S | 4/2012 | McClelland et al. | |
| D657,356 S | 4/2012 | Wikel | |
| D663,726 S | 7/2012 | Gourley | |
| D663,735 S | 7/2012 | Musselman | |
| D664,147 S | 7/2012 | Zhao et al. | |
| D671,950 S | 12/2012 | Richter | |
| 8,727,192 B2 | 5/2014 | Lai | |
| 8,757,461 B2 | 6/2014 | Zanetti | |
| 2003/0175172 A1 | 9/2003 | Altmann | |
| 2004/0247301 A1 | 12/2004 | Yip et al. | |
| 2005/0127538 A1 | 6/2005 | Fabrega | |
| 2007/0001025 A1 | 1/2007 | Caserta et al. | |
| 2007/0075159 A1 | 4/2007 | Lin | |
| 2007/0284500 A1 | 12/2007 | Fan | |
| 2008/0190978 A1 * | 8/2008 | Brassard | B60R 11/02 224/483 |
| 2008/0224007 A1 | 9/2008 | Mo | |
| 2009/0060473 A1 * | 3/2009 | Kohte | F16M 11/041 386/200 |
| 2010/0019059 A1 * | 1/2010 | Bulsink | A61L 9/127 239/55 |
| 2010/0187327 A1 | 7/2010 | Irvin | |
| 2011/0019992 A1 | 1/2011 | Orf | |
| 2011/0278885 A1 | 11/2011 | Procter et al. | |
| 2012/0205503 A1 | 8/2012 | Kobal | |
| 2013/0037590 A1 | 2/2013 | Yoon | |
| 2014/0097306 A1 | 4/2014 | Hale et al. | |
| 2014/0103087 A1 | 4/2014 | Fan | |

FOREIGN PATENT DOCUMENTS

| | | |
|---|---|---|
| DE | 202008010276 U1 | 11/2008 |
| DE | 202008 010276 U1 | 12/2008 |
| EP | 1031446 A1 | 8/2000 |
| EP | 1902736 A1 | 3/2008 |
| JP | 2003054304 A | 2/2003 |
| JP | 3151546 U | 6/2009 |
| JP | 3164223 U | 11/2010 |
| KR | 10-2000-0044438 | 7/2000 |
| KR | 20-0429528 | 10/2006 |
| KR | 10-2012-0125933 | 11/2012 |
| WO | 9604153 | 2/1996 |
| WO | WO2004091673 A1 | 10/2004 |
| WO | 2010002291 A1 | 1/2010 |

OTHER PUBLICATIONS

Arkon Resources Inc., SM429-SBH Universal Air Vent Swivel Mount with Adjustable Cradle, 2010.

Decision to Grant mailed Jul. 5, 2016, in Russian Application No. 2015137589.

Exam Report, search report mailed Apr. 22, 2016, in European Application No. 147798238.3.

Office Action mailed Apr. 14, 2016, in Korean Application No. 10-2015-7035564.

Office Action mailed Jul. 14, 2016, in Korean Application No. 10-2015-7035564.

Notice of Allowance mailed Aug. 23, 2016, in Korean Application No. 10-2015-7035564.

Web posting, entitled "[Arkon Air Vent Smartphone Car Mount] Review of SM429-SBH Air Vent Universal Smartphone Car Mount" (Publication Date: Nov. 21, 2010, http://cafe.naver.com/bjphone/1391925).

Web posting entitled, "Car Mount for Samsung Galaxy S4 Smartphone [Air Vent Smartphone Car Mount]" (Publication Date: Apr. 29, 2013, http://blog.naver.com/eeleet/130167208063).

Amendment filed Oct. 11, 2016, in European Application No. 147798238.3.

Office Action dated Nov. 9, 2016, in Mexican Application No. MX/a/2015/015365.

Amendment filed Dec. 8, 2016, in Mexican Application No. MX/a/2015/015365.

Amendment filed Dec. 20, 2016, in Mexican Application No. MX/a/2015/015365.

Design U.S. Appl. No. 29/599,624, filed Apr. 5, 2017 by Minn et al.

* cited by examiner

ADJUSTABLE PORTABLE DEVICE HOLDER

CROSS-REFERENCE TO RELATED APPLICATIONS

This application is a Continuation application of U.S. application Ser. No. 13/897,062, entitled "Adjustable portable device holder", which was filed May 17, 2013 and is a continuation-in-part (CIP) of U.S. Design patent application Ser. No. 29/437,793, filed Nov. 20, 2012 and titled DASHBOARD VENT MOUNT FOR AN ELECTRONIC DEVICE, each of which are incorporated by reference in their entirety, for all purposes, herein.

FIELD OF TECHNOLOGY

The present application is directed to adjustable portable device holder systems and methods.

BACKGROUND

Various electronic and other device mounts are known in the art. Available device mounts have many drawbacks. For instance, suction cup mounts are typically large, bulky and require a large mounting surface such as a windshield. Device mounts often fail to properly and consistently attach to the mounting surface. Some device mounting solutions require adhesive to secure the mount to a vehicle dash, wearing off over time and leaving an undesirable residue on the mounting surface. Current device mounts also fail to effectively accommodate a broad range of devices or mounting surfaces.

Due to the deficiencies in the currently available device mounts, people choose not use electronic device mounts and often violate state and provincial hands-free driving laws. Other state and provincial laws prohibit objects mounted to the windshield to prevent obstruction of the driver's view.

This specification is directed to improved portable device holder systems and methods for manufacturing the same.

SUMMARY

Adjustable portable device holder systems and methods for manufacturing the same are herein disclosed. According to one embodiment, an adjustable portable device holder includes an adjustable clamping element and a rotatable mounting element attached to the adjustable clamping element for removably securing a portable device to the adjustable portable device holder. The adjustable clamping element is capable of being biased into an activated state and unbiased into a deactivated state to secure one of a plurality of different size portable devices to the adjustable portable device holder. The rotatable mounting element, attached to the adjustable clamping element, includes a plurality of mounting arms each spaced a specified distance apart from one another and extending at a specified angle from a bottom surface of the rotatable mounting element. Each pair of the plurality of mounting arms forms a mounting slot therein between. The rotatable mounting element is capable of being rotated to position a first mounting slot in a vertical, horizontal or diagonal orientation and a second mounting slot in a vertical, horizontal or diagonal orientation to engage a first mounting surface in a vertical, horizontal or diagonal orientation or a second mounting surface in a vertical, horizontal or diagonal orientation.

In another embodiment, a process for manufacturing an exemplary adjustable portable device holder is disclosed. The process includes providing an adjustable clamping element capable of being biased into an activated state and unbiased into a deactivated state to secure one of a plurality of portable device sizes to the adjustable portable device holder. The process also includes providing a rotatable mounting element comprising a plurality of mounting arms each spaced a specified distance apart from one another and extending at a specified angle from a bottom surface of the rotatable mounting element. Each pair of the plurality of mounting arms form a mounting slot therein between. The rotatable mounting element is capable of being rotated to position a first mounting slot in a vertical, horizontal or diagonal orientation and a second mounting slot in a vertical, horizontal or diagonal orientation to engage a first mounting surface in a vertical, horizontal or diagonal orientation or a second mounting surface in a vertical, horizontal or diagonal orientation. The process also includes attaching the rotatable mounting element to the adjustable clamping element.

The foregoing and other objects, features and advantages of the present disclosure will become more readily apparent from the following detailed description of exemplary embodiments as disclosed herein.

BRIEF DESCRIPTION OF THE DRAWINGS

Embodiments of the present application are described, by way of example only, with reference to the attached Figures, wherein.

DETAILED DESCRIPTION

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, methods, procedures and components have not been described in detail so as not to obscure the embodiments described herein.

The adjustable portable device holders described in this specification can include an adjustable clamping element attached to a rotatable mounting element. The adjustable portable device holder can be used to attach and mount a portable device to a mounting surface. The portable device can be any device that fits into the adjustable clamping element including, but not limited to a smartphone or other phone, a tablet, an e-reader, a powerbank, a speaker, a multimedia player, a flashlight or other light, a television or other display, a laser or radar detector, an air freshener, a fan, a beverage or other device that can fit into the adjustable clamping element. The adjustable portable device holder can be mounted to various mounting surfaces including, but not limited to an automobile air conditioner vent blade, an automobile dashboard, an automobile sun visor, a credit card, the brim of a hat, a counter, a tripod, a bicycle, a backpack, a utensil, a ledge or other surface.

Figure 1:
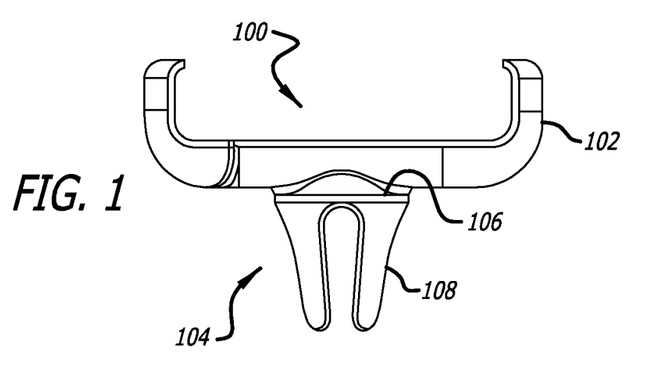
FIG. 1 illustrates an adjustable portable device holder in a retracted setting, also referred to as the deactivated state, according to one embodiment.

FIG. 1 illustrates an adjustable portable device holder 100 in a retracted setting according to one embodiment. The adjustable portable device holder 100 includes an adjustable clamping element 102 attached to a rotatable mounting element 104.

Figure 2:
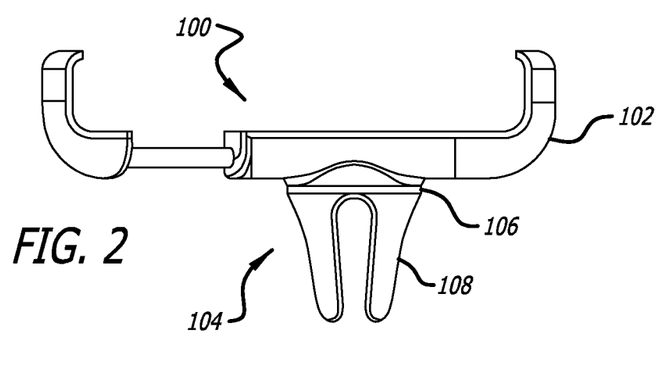
FIG. 2 illustrates an adjustable portable device holder in an expanded setting, also referred to as the activated state, according to one embodiment.

FIG. 2 illustrates an adjustable portable device holder 100 in an expanded setting according to one embodiment. The adjustable portable device holder 100 includes an adjustable clamping element 102 attached to a rotatable mounting element 104.

Figure 3:
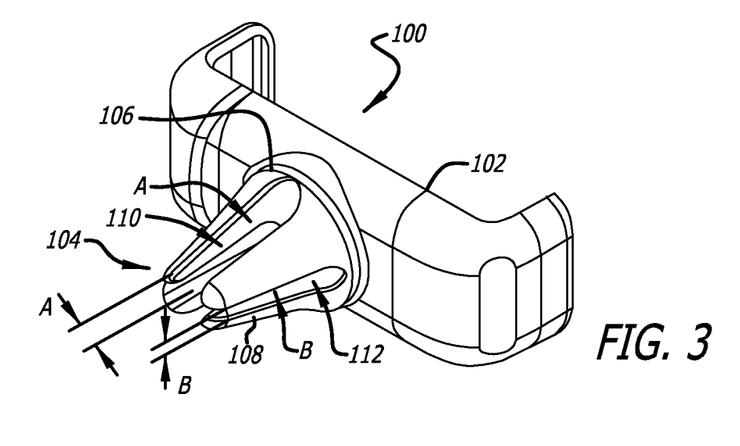
FIG. 3 illustrates an adjustable portable device holder in a retracted setting according to one embodiment.

FIG. 3 illustrates an adjustable portable device holder 100 in a retracted setting according to one embodiment. The adjustable portable device holder 100 includes an adjustable clamping element 102 attached to a rotatable mounting element 104.

The adjustable clamping element 102 illustrated in FIGS. 1-3 can be expanded and retracted to attach devices of different sizes to the adjustable portable device holder 100. A force can be applied to expand or bias the adjustable clamping element 102 into an activated state (shown in FIG. 2) and the force can be released to retract the adjustable clamping element 102 into a deactivated state (shown in FIGS. 1 and 3). An elastic retracting or biasing element (not shown), such as a compression or torsion spring can be incorporated into the adjustable clamping element 102. The compression or torsion spring facilitates the expansion and retraction of the adjustable clamping element 102 upon applying or releasing an expansive force on a surface of the adjustable clamping element 102.

The adjustable clamping element 102 can also include a gripping material on a surface of the adjustable clamping element 102 to provide a better grip, a better viewing angle or better attachment to a device secured within the adjustable clamping element 102. The gripping material can be applied to a portion of the adjustable clamping element 102 or the entire adjustable clamping element 102 can be made of the gripping material. The gripping material can be any material that increases the adhesion, grip or coefficient of friction between the gripping surface of the adjustable clamping element 102 and a surface of a device secured within the adjustable clamping element 102. The gripping material can include, but is not limited to rubber, polymeric material or other plastic, metal, alloy, fabric, composite material or other material capable of increasing the adhesion, grip or coefficient of friction between the gripping surface of the adjustable clamping element 102 and a surface of a device secured within the adjustable clamping element 102. The gripping material and gripping surface can be textured and composed of the same or different material.

The rotatable mounting element 104 illustrated in FIGS. 1-3 can be directly or indirectly attached to the adjustable clamping element 102. The adjustable clamping element 102 and the rotatable mounting element 104 can be one integral part or component parts that are attached together by any attaching means that allows the rotatable mounting element 104 to rotate. The rotatable mounting element 104 includes a base plate 106 and a plurality of mounting arms 108 extending from the base plate 106. The base plate 106 and the plurality of mounting arms 108 can be one integral part or component parts that are attached together by any attaching means.

Referring to FIG. 3, the base plate 106 can be a cylindrically shaped disc or other element that is capable of being rotated 360 degrees clockwise or counter-clockwise. The base plate 106 provides a rotating platform from which mounting arms 108 extend. The mounting arms 108 are spaced a specified distance apart relative to one another on the base plate 106. The mounting arms 108 also extend from the base plate 106 at a specified angle relative to the base plate 106. The size of the mounting arms 108, the distance between the mounting arms 108 and the angle at which the mounting arms 108 extend from the base plate 106 establish and define mounting slots 110, 112 between pairs of mounting arms 108. The rotatable mounting element 104 can include any number of mounting arms 108 and any number of mounting slots 110, 112.

The mounting arms 108 can also include a gripping material on a surface of the mounting arms 108 to provide a better grip, a better viewing angle or better attachment to a mounting surface secured between the mounting arms 108. The gripping material can be applied to a portion of mounting arms 108 or the entirety of the mounting arms 108 can be made of the gripping material. The gripping material can be any material that increases the adhesion, grip or coefficient of friction between the gripping surface of mounting arms 108 and a mounting surface secured between the mounting arms 108. The gripping material can include, but is not limited to rubber, polymeric material or other plastic, metal, alloy, fabric, composite material or other material capable of increasing the adhesion, grip or coefficient of friction between the gripping surface of mounting arms 108 and a mounting surface secured between the mounting arms 108. The gripping material and gripping surface can be textured and composed of the same or different material.

In one exemplary embodiment, the rotatable mounting element 104 includes four mounting arms and four mounting slots. In another exemplary embodiment, the rotating mounting element 104 includes 6 mounting arms and six mounting slots.

The mounting arms 108 and mounting slots 110, 112, can engage a mounting surface (not shown) to mount the adjustable portable device holder 100. The adjustable portable device holder 100 is mounted to a mounting surface by positioning, press fitting or wedging a mounting surface within one or more mounting slots 110, 112 to engage two or more mounting arms 108. The adjustable portable device holder 100 can be mounted to various mounting surfaces including, but not limited to an automobile air conditioner vent blade, an automobile dashboard, an automobile sun visor, a credit card, the brim of a hat, a counter, a tripod, a bicycle, a backpack, a utensil, a ledge or other surface that can be positioned, press fit or wedged within one or more mounting slots 110, 112 between two or more mounting arms 108.

The rotatable mounting element 104 can include any number of mounting arms 108 forming and defining any number of mounting slots 110, 112. As may be appreciated in at least FIGS. 1-3, 7, 8, 10, 11, 15, 16, 18 and 19, the size and shape of the mounting slots 110, 112 formed between pairs of mounting arms 108 can be controlled by adjusting the size and shape of the paired mounting arms 108, the distance between the pair of mounting arms 108 and the angle at which the two mounting arms 108 extend from the base plate 106 and converge toward one another. As depicted, each mounting arm 108 and mounting slot 110, 112 tapers in a direction away from a bottom surface of the rotatable mounting element 104. The rotatable mounting element 104 can include one or more different size mounting slots 110, 112 to accommodate different size mounting surfaces. For instance in FIG. 3, one mounting slot 110 having clearance A can be larger than another mounting slot 112 having clearance B. One or more of the mounting slots 110 formed on the rotatable mounting element 104 can accommodate a larger mounting surface than other mounting slots 112 formed on the rotatable mounting element 104.

The rotatable mounting element 104 can be rotated to position the mounting arms 108 and mounting slots 110, 112 in a horizontal plane, vertical plane, diagonal plane, circular plane, concave plane, convex plane or any plane between vertical and horizontal planes relative to the force of gravity. The mounting arms 108 and mounting slots 110, 112 can be positioned to engage a mounting surface in any engagement plane within the 360 degree rotation of the mounting element 104. The rotatable mounting element 104 can be rotated to position a relatively larger mounting slot 110 with clearance A in a horizontal, vertical, diagonal, circular, concave or convex plane to engage a relatively larger mounting surface in a horizontal, vertical, diagonal, circular, concave or convex engagement plane. The rotatable mounting element 104 can also be rotated to position a relatively smaller mounting slot 112 with clearance B in a horizontal, vertical, diagonal, circular, concave or convex plane to engage a relatively smaller mounting surface in a horizontal, vertical, diagonal, circular, concave or convex engagement plane.

The rotatable mounting element is capable of being rotated 360 degrees clockwise or counter-clockwise to engage different size mounting surfaces in a horizontal plane, vertical plane, diagonal plane, circular plane, concave plane, convex plane or any plane between vertical and horizontal planes. A device attached to the adjustable portable device holder 100 via the adjustable clamping element 102 can also be rotated 360 degrees clockwise or counter-clockwise while it is attached to the adjustable portable device holder 100 by rotating the rotatable mounting element 104.

Figure 4A:
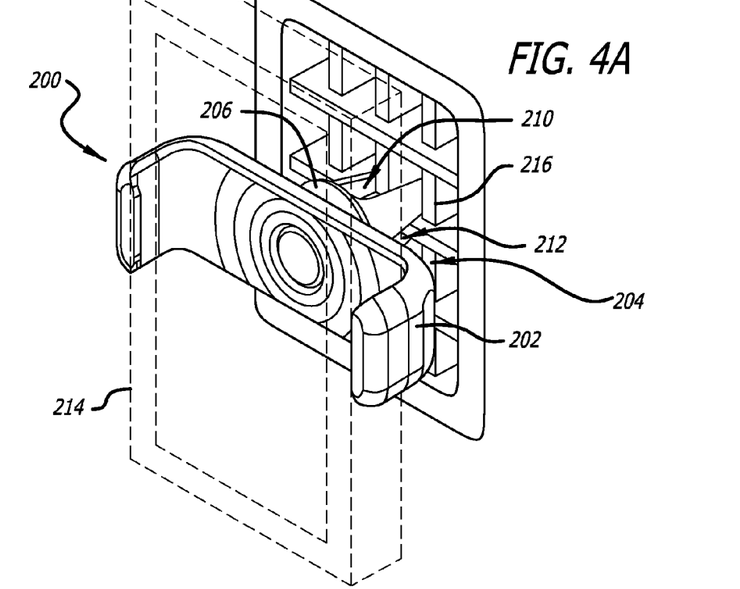
FIGS. 4A and 4B illustrate an adjustable portable device holder attached to a device and a mounting surface according to one embodiment.
Figure 4B:
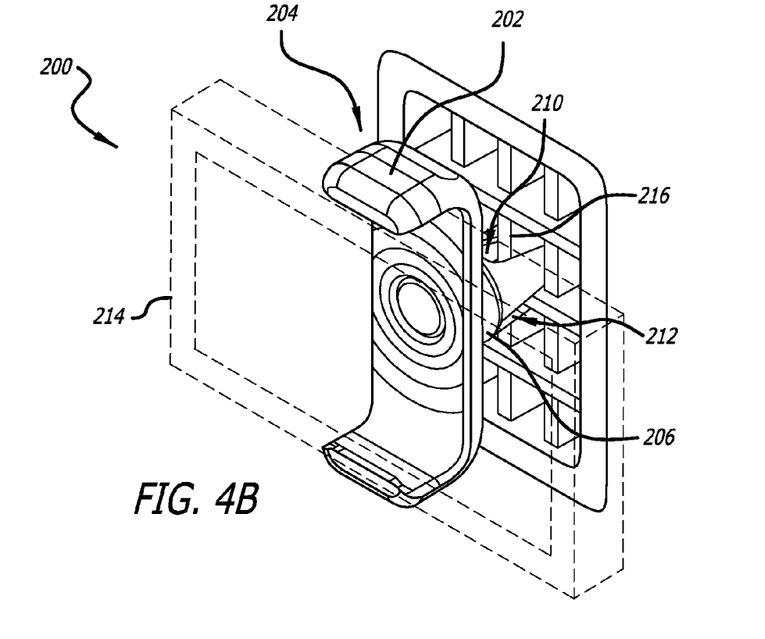

FIGS. 4A and 4B illustrate an adjustable portable device holder 200 attached to a device 214 and a mounting surface 216 according to one embodiment. The device 214 is a smart phone and the mounting surface 216 is an automobile air conditioner vent blade.

Other portable devices can also fit into the adjustable clamping element including, but not limited to a tablet, an e-reader, a powerbank, a speaker, a multimedia player, a flashlight or other light, a television or other display, a laser or radar detector, an air freshener, a fan, a beverage or other device. The adjustable portable device holder 200 can also be mounted to other mounting surfaces including, but not limited to an automobile dashboard, an automobile sun visor, a credit card, the brim of a hat, a counter, a tripod, a bicycle, a backpack, a utensil, a ledge or other surface.

The adjustable portable device holder 200 includes an adjustable clamping element 202 attached to a rotatable mounting element 204. The adjustable clamping element 202 can be expanded and retracted to attach different size smartphones to the adjustable portable device holder 200. A force can be applied to expand or bias the adjustable clamping element 202 into an activated state and the force can be released to retract the adjustable clamping element 202 into a deactivated state to clamp around the smartphone 214. An elastic retracting or biasing element (not shown), such as a compression or torsion spring can be incorporated into the adjustable clamping element 202 to facilitate the expansion and retraction of the adjustable clamping element 202 and to accommodate different size smartphones.

The adjustable clamping element 202 can also include a gripping material on a surface of the adjustable clamping element 202 to provide a better grip, a better viewing angle or better attachment to the smart phone 214 or other device secured within the adjustable clamping element 202. The gripping material can be applied to a portion of the adjustable clamping element 202 or the entire adjustable clamping element 202 can be made of the gripping material. The gripping material can be any material that increases the adhesion, grip or coefficient of friction between the gripping surface of the adjustable clamping element 202 and a surface of a device secured within the adjustable clamping element 202. The gripping material can include, but is not limited to rubber, polymeric material or other plastic, metal, alloy, fabric, composite material or other material capable of increasing the adhesion, grip or coefficient of friction between the gripping surface of the adjustable clamping element 202 and a surface of a device secured within the adjustable clamping element 202. The gripping material and gripping surface can be textured and composed of the same or different material.

The rotatable mounting element 204 can be directly or indirectly attached to the adjustable clamping element 202. The adjustable clamping element 202 and the rotatable mounting element 204 can be one integral part or component parts that are attached together by any attaching means, such as a screw, ratchet, pin, rod or friction or other device that allows the rotatable mounting element 204 to rotate. The rotatable mounting element 204 includes a base plate 206 and a plurality of mounting arms 208 extending from the base plate 206. The base plate 206 and the plurality of mounting arms 208 can be one integral part or component parts that are attached together by any attaching means.

The base plate 206 can be a cylindrically shaped disc or other element that is capable of being rotated 360 degrees clockwise or counter-clockwise. The base plate 206 provides a rotating platform from which the mounting arms 208 extend. The mounting arms 208 are spaced a specified distance apart relative to one another on the base plate 206. The mounting arms 208 also extend from the base plate 206 at a specified angle relative to the base plate 206. The size of the mounting arms 208, the distance between the mounting arms 208 and the angle at which the mounting arms 208 extend from the base plate 206 establish and define mounting slots 210, 212 between pairs of mounting arms 208. The rotatable mounting element 204 includes four mounting arms 208 and four mounting slots 210, 212.

The mounting arms 208 and mounting slots 210, 212, can engage and attach to an air conditioner vent blade 216 to mount the adjustable portable device holder 200. The adjustable portable device holder 200 is mounted to the air conditioner vent blade 216 by positioning, press fitting or wedging a surface of the air conditioner vent blade 216 within one or more mounting slots 210, 212 to engage two or more mounting arms 208.

The mounting arms 208 can also include a gripping material on a surface of the mounting arms 208 to provide a better grip, a better viewing angle or better attachment to the air conditioner vent blade 216 secured between mounting arms 208. The gripping material can be applied to a portion of mounting arms 208 or the entirety of the mounting arms 208 can be made of the gripping material. The gripping material can be any material that increases the adhesion, grip or coefficient of friction between the gripping surface of mounting arms 208 and an air conditioner vent blade 216 secured between the mounting arms 208. The gripping material can include, but is not limited to rubber, polymeric material or other plastic, metal, alloy, fabric, composite material or other material capable of increasing the adhesion, grip or coefficient of friction between the gripping surface of mounting arms 208 and the air conditioner vent blade 216 secured between the mounting arms 208. The gripping material can be and gripping surface and composed of the same or different material.

The rotatable mounting element 204 includes two different sizes of mounting slots 210, 212 to accommodate different size air conditioner vent blades 216 or other mounting surfaces. Two mounting slots 210 having clearance A are larger than the other two mounting slots 212 having clearance B.

The rotatable mounting element 204 can be rotated to position the mounting arms 208 and mounting slots 210, 212 in a horizontal, vertical, diagonal, circular, concave, convex or any plane between vertical and horizontal planes to engage air conditioner vent blades 216 oriented in a horizontal, vertical, diagonal, circular, concave, convex or any plane between vertical and horizontal planes. The mounting arms 208 and mounting slots 210, 212 can be positioned to attach to an air conditioner vent blade in any engagement plane within the 360 degree rotation of the mounting element 204. The rotatable mounting element 204 can be rotated to position the larger mounting slots 210 with clearance A in a horizontal, vertical, diagonal, circular, concave, convex or any plane between vertical and horizontal planes to engage or attach to larger air conditioner vent blades 216 oriented in a horizontal, vertical, diagonal, circular, concave, convex or any plane between vertical and horizontal planes. The rotatable mounting element 204 can also be rotated to position the smaller mounting slots 212 with clearance B in a horizontal, vertical, diagonal, circular, concave, convex or any plane between vertical and horizontal planes to engage or attach to smaller air conditioner vent blades 216 oriented in a horizontal, vertical, diagonal, circular, concave, convex or any plane between vertical and horizontal planes.

The rotatable mounting element 204 is capable of being rotated 360 degrees clockwise or counter-clockwise to engage different size mounting surfaces in a horizontal, vertical, diagonal, circular, concave, convex or any plane between vertical and horizontal planes relative to the force of gravity. The smart phone 214 attached to the adjustable portable device holder 200 can be rotated into a portrait orientation (shown in FIG. 4A) and a landscape orientation (shown in FIG. 4B) by rotating the rotatable mounting element 204. The smart phone 214 attached to the adjustable portable device holder 200 can be rotated 360 degrees clockwise or counter-clockwise while it is attached to the adjustable portable device holder 200 by rotating the smart phone 214 and adjustable clamping element 202, while the rotatable mounting element 204 is secured to a mounting surface.

Figure 5:
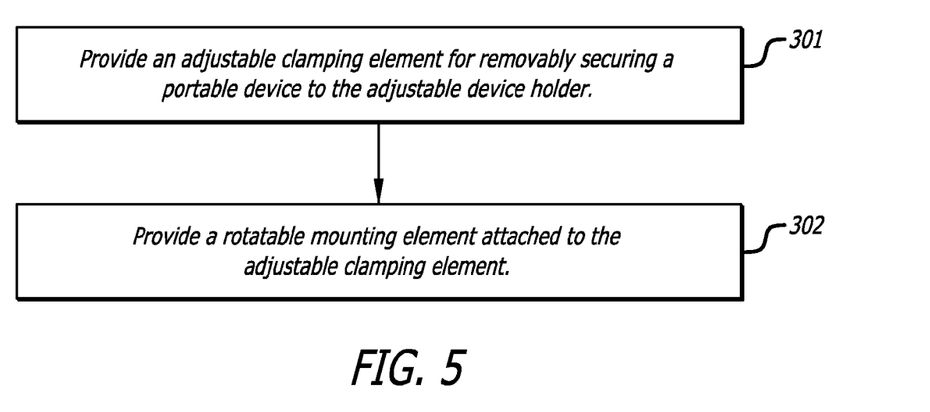
FIG. 5 illustrates a flow chart of a process for manufacturing an exemplary adjustable portable device holder according to one embodiment.
Figure 6:
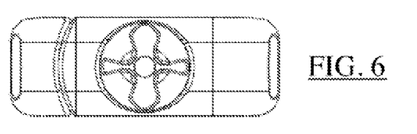
FIG. 6 is an elevation view of the back of an adjustable portable device holder in a retracted setting.
Figure 7:
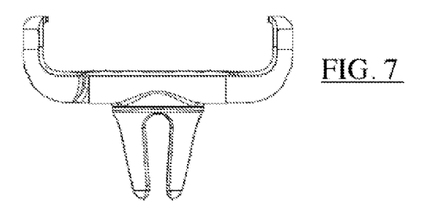
FIG. 7 is a plan view of the top of an adjustable portable device holder in a retracted setting.
Figure 8:
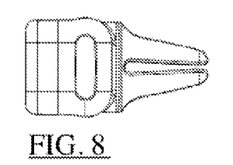
FIG. 8 is an elevation view of left side of an adjustable portable device holder in a retracted setting.
Figure 9:
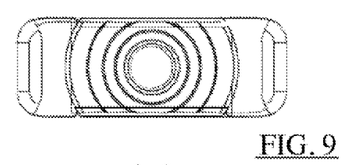
FIG. 9 is an elevation view of the front of an adjustable portable device holder in a retracted setting.
Figure 10:
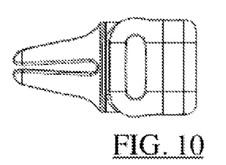
FIG. 10 is an elevation view of the right side of an adjustable portable device holder in a retracted setting.
Figure 11:
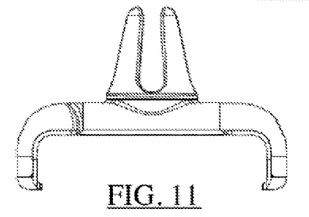
FIG. 11 is a plan view of the bottom of an adjustable portable device holder in a retracted setting.
Figure 12:
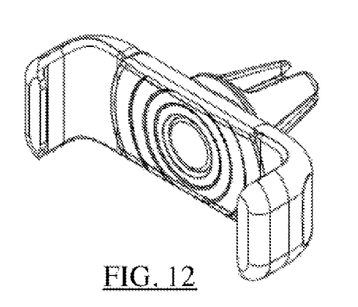
FIG. 12 is an isometric view, from the front right, of an adjustable portable device holder in a retracted setting.
Figure 13:
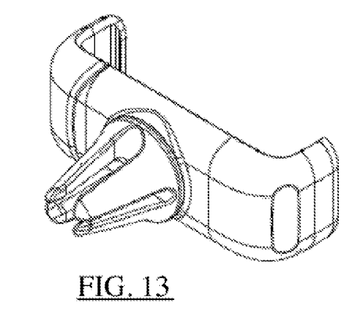
FIG. 13 is an isometric view, from the back left, of an adjustable portable device holder in a retracted setting.
Figure 14:
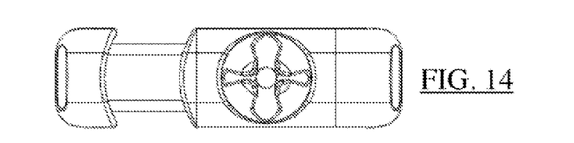
FIG. 14 is an elevation view of the back of an adjustable portable device holder in an expanded setting.
Figure 15:
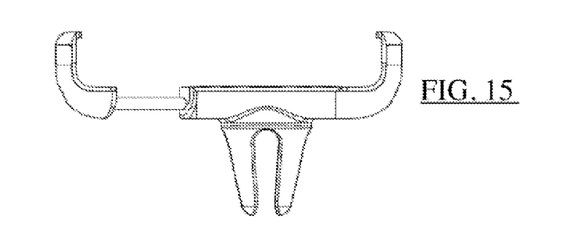
FIG. 15 is a plan view of the top of an adjustable portable device holder in an expanded setting.
Figure 16:
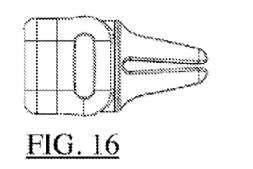
FIG. 16 is an elevation view of left side of an adjustable portable device holder in an expanded setting.
Figure 17:
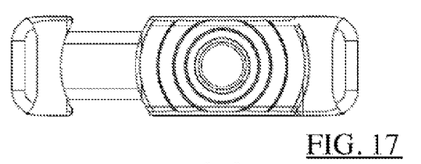
FIG. 17 is an elevation view of the front of an adjustable portable device holder in an expanded setting.
Figure 18:
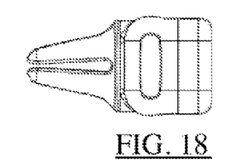
FIG. 18 is an elevation view of the right side of an adjustable portable device holder in an expanded setting.
Figure 19:
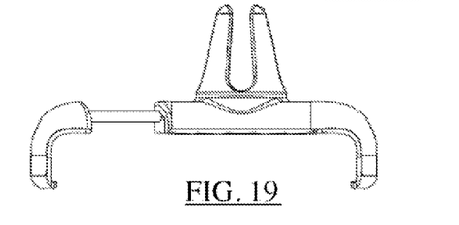
FIG. 19 is a plan view of the bottom of an adjustable portable device holder in an expanded setting.
Figure 20:
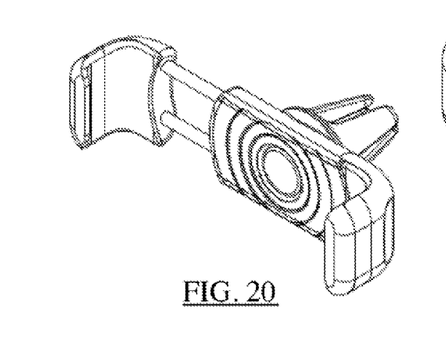
FIG. 20 is an isometric view, from the front right, of an adjustable portable device holder in an expanded setting.
Figure 21:
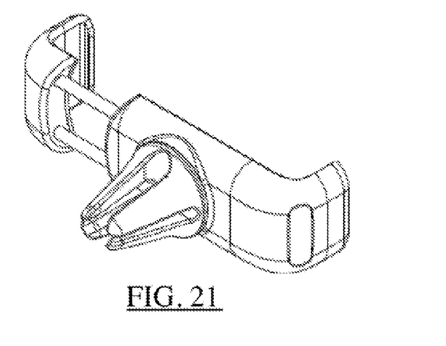
FIG. 21 is an isometric view, from the back left, of an adjustable portable device holder in an expanded setting.

FIG. 5 illustrates a flow chart of a process for manufacturing an exemplary adjustable portable device holder according to one embodiment. At step 301, the process includes providing an adjustable clamping element for removably securing a portable device to the adjustable portable device holder. The adjustable clamping element is capable of being biased into an activated state and unbiased into a deactivated state to secure one of a plurality of different size portable device to the adjustable portable device holder.

As an example and as depicted in FIGS. 2, 14, 15, 16 and 19-21, to manufacture the adjustable portable device holder, two stainless steel rods can be inserted into an expandable arm cavity of a double injection mold. PC/ABS is injected into the cavities of the mold to hold the rods in place and to produce an expandable arm, main body and cover of an adjustable clamping element. The mold is then rotated and injected with TPE to form side grips of the expandable arm and body of the adjustable clamping element. A stainless steel spring is inserted over each rod and held in place by a stainless steel screw affixed to the end of the rods. Grease is added to the lower portion of the spring and rods (near the screw head). The expandable arm is inserted into the body and the springs are lowered and held in place within the body of the adjustable clamping element. The cover is then slid on to the body to hold the adjustable arm in place.

The adjustable clamping element or a surface thereof can also be formed from rubber, polymeric material or other plastic, metal, alloy, or composite material that is rigid, semi-rigid or textured.

At step 302, a rotatable mounting element is provided, which can be attached to the adjustable clamping element via screw, ratchet, pin, rod or friction or other attachment means. The rotatable mounting element includes a plurality of mounting arms each spaced a specified distance apart from one another and extending at a specified angle from a bottom surface of the rotatable mounting element. Each pair of the plurality of mounting arms form a mounting slot therein between. The rotatable mounting element is capable of being rotated to position a first mounting slot in a vertical, horizontal or diagonal orientation and a second mounting slot in a vertical, horizontal or diagonal orientation to engage a first mounting surface in a vertical, horizontal or diagonal orientation or a second mounting surface in a vertical, horizontal or diagonal orientation.

For example, a rotatable mounting element can be formed in whole or part from stainless metal or other metal, alloy or plastic sheet stamped to form a clip or base plate with four arms extending from the base plate, spaced a specified distance apart and bent to a desired angle. If metal or other heat treatable material, the rotatable mounting element can be heat treated to form a rigid structure. The rotatable mounting element or a surface thereof can also be formed from rubber, polymeric material or other plastic, metal, alloy, or composite material that is rigid, semi-rigid or textured.

A zinc-alloy nut or other alloy or material can be formed using a die-cast mold to attach the rotatable mounting element to the adjustable clamping element. Glue is added to the cavity of the nut. The rotatable mounting element is affixed to the main body of the adjustable clamping element via the nut and a second stainless screw. A force gage is used to monitor the rotational force of the rotatable mounting element and the rotatable mounting element is adjusted if screw is too tight or loose.

TPE is injected into a mold to create a skirt and four socks. The skirt and four socks can also be formed from rubber, polymeric material or other plastic, metal, alloy, or composite material that is rigid, semi-rigid or textured. The skirt is assembled over the mounting arms of the rotatable mounting element. Glue is added to each mounting arm of the rotatable mounting element. A sock is inserted over each mounting arm, which holds the skirt in place.

Example embodiments have been described hereinabove regarding adjustable portable device holder systems and methods. Various modifications to and departures from the disclosed example embodiments will occur to those having ordinary skill in the art. The subject matter that is intended to be within the spirit of this disclosure is set forth in the following claims.

What is claimed is:

1. A portable device holder comprising:
   an adjustable clamping element comprising a pair of opposing side grips, the adjustable clamping element being adjustable between activated and deactivated states by linearly translating at least one of the side grips to removably secure one of a plurality of different sized portable devices to the adjustable clamping element;
   a mounting element including a rotatable base plate having a first side and a second side opposite the first side, the first side of the rotatable base plate flush with and rotatably attached to a main body of the adjustable clamping element, the rotatable base plate providing a rotating platform that enables the mounting element to be rotated at least one of clockwise or counter-clockwise relative to the adjustable clamping element; and
   the mounting element also including four mounting arms extending from the second side of the base plate and spaced apart from and converging towards one another to define at least two different sized mounting slots when the four mounting arms are not engaged with any mounting surface;
   wherein the at least two different sized mounting slots accommodate engagement with at least two different sized mounting surfaces; and
   wherein the at least two different sized mounting slots are rotatable relative to the adjustable clamping element by rotating the base plate relative to the main body of the adjustable clamping element, thereby enabling the portable device holder to hold and mount one of a plurality of different sized portable devices to at least two different sized mounting surfaces in multiple different orientations.

2. The portable device holder of claim 1,
   wherein a width of each of the mounting slots tapers away from the bottom surface of the mounting element; and
   wherein the mounting element is capable of releasably setting each of the mounting slots in two 180 degree spaced apart vertical orientations and two 180 degree spaced apart horizontal orientations for alternative engagement with vertically and horizontally oriented mounting surfaces.

3. The portable device holder of claim 2, wherein at least one of the at least two different sized mounting surfaces that the mounting slots are configured to engage comprises an air conditioner vent blade in an automobile.

4. The portable device holder of claim 1, wherein the mounting arms comprise a gripping surface constructed from rubber, polymeric material, plastic, metal, alloy or composite material.

5. The portable device holder of claim 1, wherein the mounting element is operable to be rotated 360 degrees.

6. The portable device holder of claim 1, wherein the mounting element is attached with a fastener to the adjustable clamping element.

7. The portable device holder of claim 6, wherein the fastener includes a ratchet device, a screw, or a pin.

8. The portable device holder of claim 1, wherein the mounting element is friction fit to the adjustable clamping element.

9. The portable device holder of claim 1, wherein the mounting slot is operable to be rotated to a vertical, horizontal or diagonal arrangement.

10. The portable device holder of claim 1, wherein the four mounting arms and the rotatable base plate of the mounting element are integrally formed with each other.

11. The portable device holder of claim 1, wherein:
    the mounting element comprises a metal or alloy sheet stamped to form the base plate with the four mounting arms extending therefrom; and
    the four mounting arms extending from the base plate are bent relative to the base plate so that the four mounting arms extend from the second side of the base plate and converge towards one another; and
    four molded socks are inserted one over each of the four mounting arms, each said molded sock molded from at least one of rubber, polymeric material or plastic.

12. The portable device holder of claim 1, wherein:
    the adjustable clamping element further comprises a rod and a spring inserted over the rod; and
    an expandable arm of the adjustable clamping element is translatable, along the rod, relative to the main body of the adjustable clamping element.

13. A portable device holder comprising:
    an adjustable clamping element comprising a pair of opposing side grips, the adjustable clamping element being adjustable between activated and deactivated states by linearly translating at least one of the side grips to removably secure one of a plurality of different sized portable devices to the adjustable clamping element;
    a mounting element including a rotatable base plate having a first side and a second side opposite the first side, the first side of the rotatable base plate flush with and rotatably attached to a main body of the adjustable clamping element, the rotatable base plate providing a rotating platform that enables the mounting element to be rotated at least one of clockwise or counter-clockwise relative to the adjustable clamping element;

the mounting element also including first and second mounting arms extending from the second side of the base plate and spaced apart from one another and defining a mounting slot configured to accommodate engagement with a mounting surface;

wherein the mounting slot is rotatable relative to the adjustable clamping element by rotating the base plate relative to the main body of the adjustable clamping element;

wherein the adjustable clamping element comprising one or more bias members operable to urge the adjustable clamping element between the activated and deactivated states to securely engage with the one of the plurality of different sized portable devices;

wherein the one or more bias elements is/are in communication with a corresponding rod of the adjustable clamping element, and an expandable portion of the adjustable clamping element is translatable along the corresponding rod;

wherein the one or more bias elements comprise one or more compression or torsion springs; and wherein a fastener secures each of the one or more compression or torsion springs to the corresponding rod.

14. The portable device holder of claim 13, wherein the one or more bias elements is/are operable to receive an applied force that causes the adjustable clamping element to expand between the activated and deactivated states.

15. The portable device holder of claim 13, wherein:
the mounting element comprises a metal or alloy sheet stamped to form the base plate with the first and second mounting arms extending therefrom; and
the first and second mounting arms extending from the base plate are bent relative to the base plate so that the first and second mounting arms extend from the second side of the base plate and converge towards one another;
wherein the mounting arms also comprise a gripping surface constructed from rubber, polymeric material or plastic.

16. A portable device holder comprising:
an adjustable clamping element comprising a pair of opposing side grips, the adjustable clamping element being adjustable between activated and deactivated states by linearly translating at least one of the side grips to removably secure one of a plurality of different sized portable devices to the adjustable clamping element;
a mounting element including a rotatable base plate having a first side and a second side opposite the first side, the first side of the rotatable base plate flush with and rotatably attached to a main body of the adjustable clamping element; and
the mounting element including a plurality of mounting arms extending away from the second side of the base plate and spaced apart and converging toward one another to form at least a first mounting slot and a second mounting slot;
wherein the first mounting slot has a first clearance when not engaged with any mounting surface, and the second mounting slot has a second clearance when not engaged with any mounting surface;
wherein the first clearance is larger than the second clearance, and thereby, the first mounting slot is configured to accommodate a larger mounting surface than the second mounting slot is configured to accommodate; and
wherein the first and second mounting slots are rotatable relative to the adjustable clamping element to a plurality of arrangements, including lateral, vertical and diagonal arrangements, by rotating the base plate relative to the main body of the adjustable clamping element.

17. A portable device holder comprising:
an adjustable clamping element configured to be expanded and retracted to attach one of a plurality of different sized portable devices to the adjustable portable device holder; and
a rotatable mounting element attached to and rotatable relative to the adjustable clamping element and configured to engage a mounting surface;
the adjustable clamping element including a main body and an adjustable arm;
the adjustable clamping element also including a rod, wherein the adjustable arm of the adjustable clamping element is translatable, along the rod, relative to the main body of the adjustable clamping element;
the rotatable mounting element including a rotatable base plate having a first side and a second side opposite the first side, the first side of the rotatable base plate flush with and rotatably attached to the main body of the adjustable clamping element;
the rotatable base plate providing a rotating platform that enables the rotatable mounting element to be rotated at least one of clockwise or counter-clockwise relative to the main body of the adjustable clamping element;
the rotatable mounting element including a plurality of mounting arms extending from the base plate in a direction away from the main body and defining at least one mounting slot configured to accommodate engagement with a mounting surface;
wherein when the adjustable clamping element is completely retracted the rod is not exposed and is thereby not viewable; and
wherein when the adjustable clamping element is at least partially expanded there is a gap, between the main body and the adjustable arm of the adjustable clamping element, with the rod exposed and thereby viewable within the gap.

18. The portable device holder of claim 17, wherein the plurality of mounting arms define at least two different size mounting slots, which include:
a first mounting slot having a first clearance when none of the at least two different size mounting slots is engaging any mounting surface; and
a second mounting slot having a second clearance when none of the at least two different size mounting slots is engaging any mounting surface;
the first clearance being different than the second clearance;
wherein the first clearance is larger than the second clearance, and thus, the first mounting slot is configured to accommodate engagement with a larger mounting surface than the second mounting slot is configured to accommodate.

19. A portable device holder comprising:
an adjustable clamping element comprising first and second opposing side grips and a main body, the adjustable clamping element being adjustable by linearly translating, relative to the main body, at least a portion of the adjustable clamping element from which the first side grip extends;

the adjustable clamping element also comprising a compression or torsion spring that facilitates expansion and retraction of the adjustable clamping element upon applying and releasing an expansive force on a surface of the adjustable clamping element;

a mounting element comprising a rotatable base plate flush with and rotatably attached to a back portion of the main body of the adjustable clamping element, the rotatable base plate providing a rotating platform that enables the mounting element to be rotated at least one of clockwise or counter-clockwise relative to the adjustable clamping element;

the mounting element also comprising first and second mounting arms extending from the base plate in a direction away from the main body and defining a mounting slot configured to accommodate engagement with a mounting surface;

wherein the mounting element comprises a metal or alloy sheet stamped to form the base plate with the first and second mounting arms extending from the base plate and bent relative to the base plate so that the first and second mounting arms extend from the base plate in the direction away from the main body and define the mounting slot therebetween;

wherein the mounting arms also comprise a gripping surface constructed from rubber, polymeric material or plastic;

wherein the mounting slot is rotatable relative to the adjustable clamping element by rotating the base plate relative to the main body of the adjustable clamping element thereby enabling the mounting slot to be selectively rotated between vertical and horizontal arrangements relative to the adjustable clamping element;

wherein when the adjustable clamping element is completely retracted the portion of the adjustable clamping element from which the first side grip extends is flush with a side portion of the main body; and wherein when the adjustable clamping element is at least partially expanded, by application of an expansive force to cause the portion of the adjustable clamping element from which the first side grip extends to be linearly translated relative to the main body of the adjustable clamping element, there is a gap between the side portion of the main body and the portion of the adjustable clamping element from which the first side grip extends.

* * * * *